March 2, 1954    H. S. CAMPBELL    2,670,804
AIRCRAFT HAVING ROTATIVE SUSTAINING BLADES
AND CONTROL MECHANISM FOR SUCH AIRCRAFT
Filed Nov. 22, 1946    3 Sheets-Sheet 1
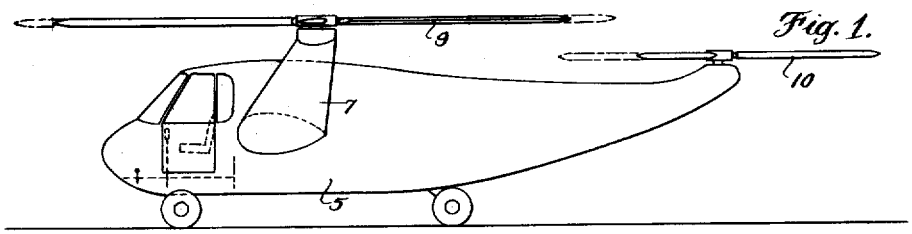
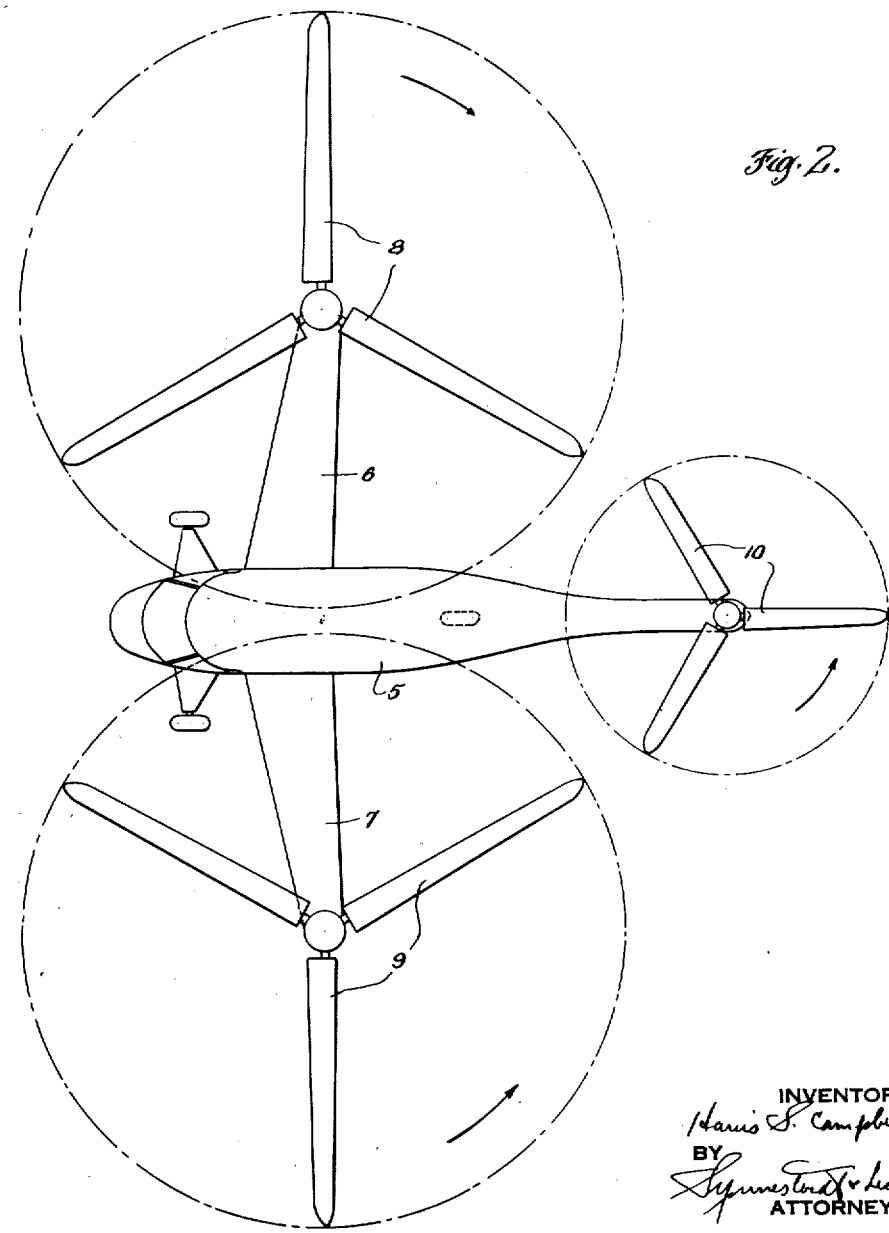

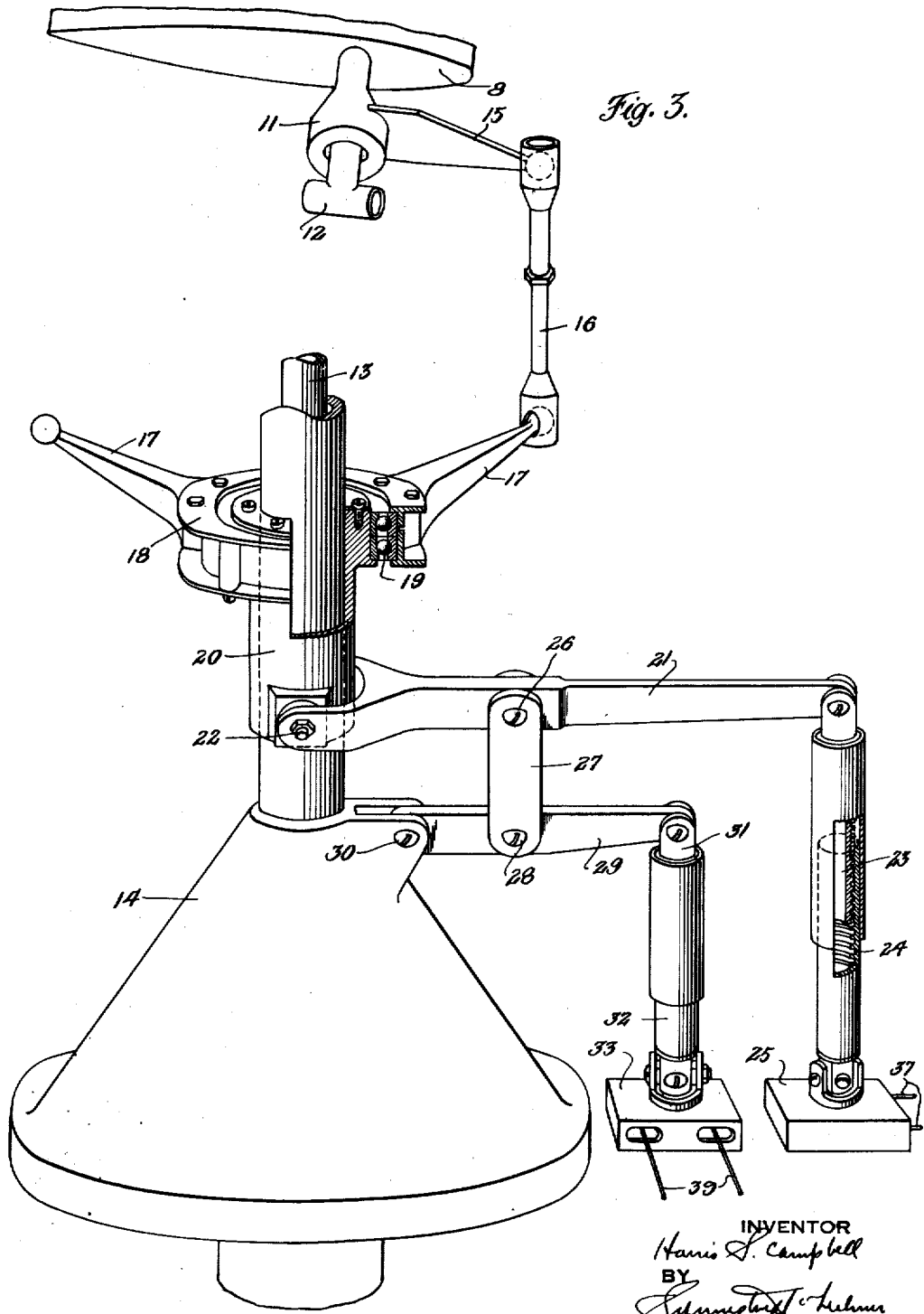

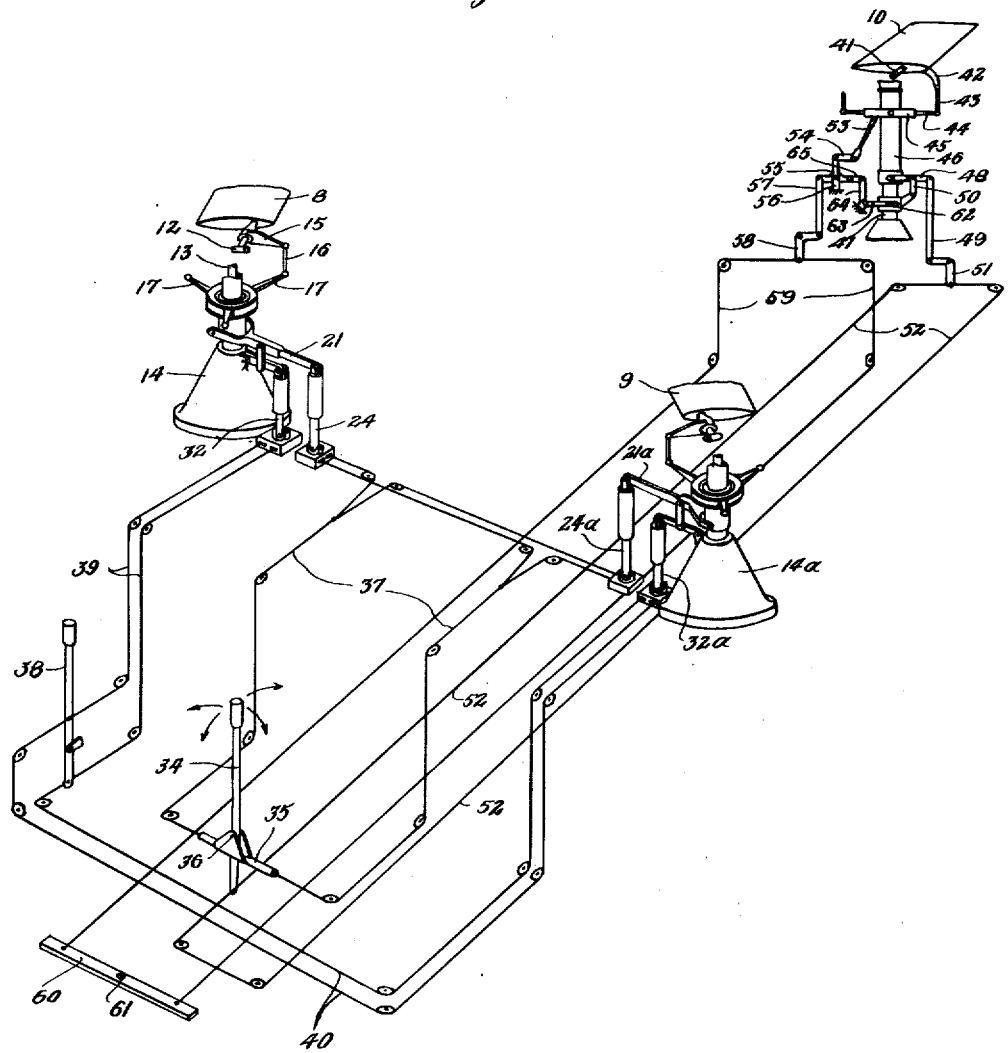

Patented Mar. 2, 1954

2,670,804

UNITED STATES PATENT OFFICE 2,670,804

AIRCRAFT HAVING ROTATIVE SUSTAINING BLADES AND CONTROL MECHANISM FOR SUCH AIRCRAFT

Harris S. Campbell, Bryn Athyn, Pa., assignor to Autogiro Company of America, Philadelphia, Pa., a corporation of Delaware Application November 22, 1946, Serial No. 711,604

8 Claims. (Cl. 170—135.24)

This invention relates to aircraft having rotative sustaining blades and to control mechanism for such aircraft. The invention is especially concerned with multiple rotor aircraft in which all of the rotors are power driven and in which all of the rotors contribute to the sustension of the aircraft.

One of the primary objects of the invention is a novel multiple rotor arrangement consisting of two relatively large diameter sustaining rotors arranged as a side-by-side pair and contributing the major portion of the sustension, together with a single relatively small diameter rotor arranged in the longitudinal vertical midplane of the aircraft and contributing a minor portion of the sustension. According to one aspect of the invention, it is contemplated that in an aircraft of the type just mentioned several of the major control functions be effected by said single relatively small diameter rotor.

Another object of the invention is the provision of a control system for a multiple rotor aircraft, especially such aircraft having the arrangement of three rotors above described, according to which most of the control functions are secured by variation of mean pitch of the several rotors, rather than by cyclic or differential variation of the pitch thereof. In this way complication of blade mountings, rotor hubs and controls is reduced to a minimum, while still retaining the necessary control about the rolling axis, the pitching axis and the vertical axis, in addition to the control for effecting rising or descending of the aircraft. More specifically, the invention contemplates employing mechanism for varying the mean pitch of the pair of main rotors, mechanism for varying the mean pitch of the single small diameter rotor, and mechanism for cyclically varying the pitch of the single small diameter rotor in one sense only, all control functions being secured by said mechanisms, without the necessity for incorporating means for cyclically varying the pitch of the main rotor blades.

A further object of the invention is the provision of pitch control means for a given rotor, such pitch control means being operative by two different controllable mechanisms, the system incorporating a special arrangement of connections providing for combining of the motions of the independently controllable mechanisms.

In considering another feature of the invention, attention is first called to the fact that in any sustaining rotor in which the lift line is tiltable (as by cyclic pitch variation) for control purposes, the vertical thrust of such rotor is reduced whenever the lift line thereof is inclined from the vertical. The invention contemplates use of a rotor of this type, i. e., a rotor incorporating means for effecting cyclic pitch variation and thus for causing lateral tilt of the lift line, provision being made, however, for automatic increase of mean pitch of the rotor whenever the lift line is tilted, so as to compensate for the resultant loss of lift thrust.

The subject-matter set out in the two preceding paragraphs is disclosed and claimed in my co-pending application Serial No. 359,887 filed June 5, 1953.

How the foregoing objects and advantages are attained, together with others which will occur to those skilled in the art, will appear more fully in the following description referring to the accompanying drawings in which—

Figure 1 is a side outline view of a three-rotor aircraft constructed in accordance with the present invention;

Figure 2 is a top plan view of the aircraft shown in Figure 1;

Figure 3 is an enlarged somewhat diagrammatic view of certain of the controls for the rotor blades of one of the rotors shown in Figures 1 and 2, with certain parts broken out and shown in section; and Figure 4 is a schematic view illustrating the control system of the present invention as applied to a three-rotor aircraft of the type shown in Figures 1 and 2.

As seen in Figures 1 and 2, the aircraft comprises a body or fuselage 5 having a pair of laterally projecting outriggers or booms 6—7, each adapted to support a main sustaining rotor, the blades of one of which are indicated at 8 and the blades of the other of which are indicated at 9, the blades of these two rotors being oriented for rotation in opposite directions. Toward the rear of the fuselage a single small diameter rotor incorporating blades 10 is provided, all three rotors being arranged to rotate substantially about vertical axes. The rear rotor 10 is adapted to rotate in a plane somewhat below that of the main rotors 8 and 9.

In the preferred arrangement of the invention the axes of the two main rotors are desirably located slightly in advance of the center of gravity of the aircraft as a whole, the axis of the small diameter rear rotor being located well to the rear of said center of gravity, these relationships being of importance in order to secure proper control functions from the several rotors, as is described fully herebelow.

It may here be noted that the various features of the controls to be described herebelow with reference to Figures 3 and 4 are applicable to rotor equipped aircraft of a variety of types, for instance aircraft in which the rotors are normally power driven, as in a helicopter, or rotors which are adapted for normal autorotative actuation. Moreover, various features of the invention are also applicable to aircraft in which the rotors are capable of both types of operation mentioned above. It is also mentioned that a number of the individual features of the control system to be described are applicable to any sustaining rotor whether the aircraft incorporates only one such rotor or a plurality thereof. However, since most features of the invention are of especial applicability to a multiple rotor aircraft in which the rotors are normally power driven, the disclosure herebelow is made with reference to that type of aircraft.

As best seen in Figure 3, each blade 8 of the right hand main rotor is adapted to be mounted at its root end by means of a journal 11 providing freedom for movement of the blade 8 in the pitch change sense, i. e., substantially about the longitudinal blade axis. Each blade is further preferably mounted by means of a flapping pivot indicated at 12, so as to provide freedom for the blade to move upwardly and downwardly and thus compensate for differential lift effects in translational flight in the manner well understood in this art. Additional blade mounting pivots such as a drag pivot may also be employed providing freedom for lag-lead blade movement generally within its mean path of rotation. It will be understood that the blade 8 shown in Figure 3 (and also the other blades of the rotor) is connected with a rotative hub through the pivot parts above mentioned, such hub being adapted to be driven by a vertical shaft indicated at 13.

It is to be understood that the blades 9 of the left hand main rotor are mounted in a manner similar to that described above in connection with Figure 3. The rotor driving and supporting shaft 13 may be journalled in any suitable manner, for instance by means of bearings housed within the fixed supporting cone or casing 14. The casing 14 may also incorporate drive gearing and other rotor drive transmission parts. Although the rotor drive transmission need not be considered in detail herein, it may be mentioned that the transmission preferably incorporates manually disconnectible means and also automatically disconnectible means providing for free overrunning of the rotors in the event of engine failure. It is contemplated that the mean rotor blade pitch of all rotors should be capable of adjustment to a value within the range at which autorotation will occur. The two main rotors are desirably geared to rotate together in positively predetermined relation, and preferably the power take-off for driving the rear rotor 10 is so arranged as to provide for continued rotation thereof with the main rotors, as by locating any clutches employed in the power transmission ahead of the point where power is taken off for the rear rotor. In this way autorotational actuation of the main rotors will serve to ensure continued rotation of the small diameter rear rotor, this being of importance in the arrangement shown, since, as described below, two of the primary control functions are assigned to the small rear rotor.

The mean blade pitch of each of the main rotors is controllable by mechanism illustrated in Figure 3. Here it will be seen that an arm 15 projects forwardly from the blade mounting journal 11, this arm serving to move the blade in the pitch change sense. Arm 15 is coupled by means of a ball jointed link 16 with an arm 17 projecting from a ring 18 which is rotatable with the rotor on a bearing 19. Bearing 19 is carried by a vertically movable sleeve 20. Upon upward movement of sleeve 20 it will be seen that the pitch angle of all of the blades 8 is increased, downward movement serving to effect simultaneous pitch decrease of all blades of the rotor.

Sleeve 20 is adapted to be moved vertically by means of a lever 21 which is pivoted to the sleeve at 22. Lever 21 may be actuated by means of a screw thread device incorporating internal and external threaded parts 23 and 24, the former being connected with lever 21 and the latter adapted to be rotated by means of a pulley or sprocket supported and enclosed within a casing 25.

Lever 21 is fulcrumed on a pivot 26 as the upper end of a link 27 which link is pivotally connected at 28 with a second lever 29, the latter being fulcrumed at 30 on a fixed part, such as the supporting cone 14. The free end of lever 29 is connected with an internal screw thread part 31 (similar to part 23 referred to above) which is in threaded engagement with an external threaded part 32 (similar to part 24), the part 32 being rotatable by a pulley or sprocket within the casing 33.

The lever system described just above is provided for the purpose of combining (in additive or subtractive senses) the motions originating from two different controllable mechanisms described herebelow with reference to Figure 4.

Turning now to Figure 4, it will first be noted that the root end of one blade of each of the three rotors is indicated adjacent to the respective mountings for the rotors. Description of various of the individual control parts for the left hand main rotor (blades 9) need not be given, since such parts are counterparts of those described above with reference to the right hand main rotor. In Figure 4 corresponding control parts for the two main rotors bear the same reference numeral, but in the case of the left hand main rotor the letter *a* has been added to the reference numeral for convenience in separate identification.

The control system includes a control stick 34 movable in a longitudinal plane about a transverse pivot 35 and in a transverse plane about a fore and aft pivot 36. A closed circuit cable system 37 is associated with the stick 34 to be actuated upon transverse movement of the control stick, the cable system 37 being associated with the rotatable screw devices 24 and 24a for the two main rotors, these screws being arranged to provide for differential variation of the mean pitch of the two main rotors. Specifically, the arrangement is such that movement of the control stick in the transverse plane toward the right causes decrease of the mean pitch of the right hand main rotor and increase of the mean pitch of the left hand main rotor. Conversely, movement of the control stick to the left causes decrease of the mean pitch of the left hand rotor and increase of the pitch of the right hand rotor. In this way instinctive lateral control, control in roll, is provided by the conventional transverse movement of the control stick.

The mean pitch value of the two main rotors may also be increased and decreased concurrently in the same sense. For this purpose a mean pitch control lever 38 is provided, a closed circuit cable system 39 being extended from lever 38 to the control device 32 for the right hand rotor and a closed circuit cable system 40 being extended from lever 38 to the control device 32a for the left hand rotor. The control cable hook-up here employed and the orientation of the screw devices 32 and 32a is preferably such that movement of the control lever 38 rearwardly causes the mean pitch of both of the main rotors to increase and movement of the control stick 38 forwardly causes the mean pitch of both of the main rotors to decrease. Thus the control stick 38 constitutes the primary control organ for regulating ascent and descent of the aircraft.

The control functions described above thus include control of vertical flight and control of banking or rolling. The functions of directional control and control about the pitching axis of the aircraft are assigned to the rear rotor. For this purpose the mounting spar or root end fitting 41 of each blade 10 of the rear rotor is journalled on the hub of that rotor in a manner providing freedom for pitch change movement, preferably about the longitudinal blade axis. It is also contemplated that the blades of this rotor shall also have freedom for movement in the flapping sense about flapping pivots such as those described above with reference to Figure 3. They may further be provided with drag pivots if desired, but since such mounting mechanism forms no part of the present invention per se, it need not be considered in detail herein.

The pitch of the blades 10 of the rear rotor is controllable by means of arms 42 projecting from the individual blades and connected by means of ball jointed links 43 with arms 44 projecting from a rotatable swash ring 45. Ring 45 is in turn carried by a nonrotatable part which is pivoted on a horizontal axis on a sleeve 46 so as to provide for tilting movement of the swash ring 45. Sleeve 46 is adapted to move vertically on the rotor supporting and driving shaft 47.

For the purpose of moving the sleeve 46 vertically and thus effecting concurrent increase or decrease of all blades 10 of the rear rotor a lever 48 is pivoted to the sleeve and also to a push-pull rod 49, the lever 48 being fulcrumed at the upper end of a pivoted link 50. Rod 49 is actuated by a bellcrank 51 one arm of which is connected with the closed circuit cable system 52 which is extended forwardly for attachment to the lower end of the control stick 34 in a manner providing for actuation thereof as a result of fore and aft movement of the control stick. This hook-up is arranged to provide for decrease of the mean pitch of the rear rotor upon rearward movement of the control stick and for increase of mean pitch of the rear rotor upon forward movement of the control stick. This system thus serves to control the longitudinal attitude of the aircraft, the control being coupled so as to provide for "instinctive" control response.

Directional control is secured by cyclically varying the pitch of the rear rotor blades. This is accomplished by tilting the swash ring 45, for which purpose an arm 53 is rigidly connected with the non-rotative swash part. The lower or free end of arm 53 is coupled by means of a link 54 with an arm 55 of an inverted T-shaped bellcrank which is pivotally carried on a fixed part at 56. This bellcrank may be actuated by a link 57 connected with one side arm thereof and also with another bellcrank 58, which latter is associated with a closed circuit cable system 59 extended forwardly for connection with a bar 60 pivoted at 61 in the manner of a rudder bar.

The hook-up of the directional control is such that forward movement of the bar 60 at its right hand side results in cyclic pitch variation of the blades of the rear rotor in a sense providing for lateral tilt of the lift line of the rear rotor toward the left, thereby introducing a thrust component toward the left. Since the rear rotor is located well to the rear of the center of gravity of the machine as a whole, this tends to turn the aircraft toward the right. Forward movement of the bar 60 at its left hand side brings about an opposite cyclic pitch variation causing the machine to turn to the left. Thus the "rudder bar" is hooked up in a manner to provide for control in the instinctive aircraft sense.

It may be mentioned in connection with the directional control described just above that since the blades of the rear rotor are mounted with freedom for flapping movement, lateral tilt of the lift line of the rear rotor is effected by cyclic pitch variation according to which the points of maximum pitch increase and maximum pitch decrease occur when the blades pass the fore and aft positions in their circle of rotation. The reasons for this sense of control response in a rotor having flappingly pivoted blades are now well known and need not be considered in detail herein.

In addition to the controls described above for the rear rotor, the rear rotor further includes automatic mechanism for effecting a pitch correction when the lift line is laterally tilted. For this purpose the link 50 which provides a fulcrum support for lever 48 is connected with a vertically movable collar 62. Collar 62 may be moved vertically by a bellcrank one arm 63 of which is pivoted thereto, the other arm 64 being connected by a link 65 with a side arm of the T-shaped bellcrank 55 above described which is incorporated in the cyclic pitch control system. Because of this interconnection between the cyclic and mean pitch control mechanisms of the rear rotor, whenever the cyclic pitch control is actuated so as to laterally tilt the lift line of the rear rotor in either direction from a substantially vertical position, the link 50 is raised, thereby causing upward movement of the supporting sleeve 46 and the swash member 45. Such upward movement of the swash member results in increase of pitch of all blades of the rear rotor.

The mechanism described just above thus automatically compensates for the decrease of sustension derivable from the rear rotor when its lift line is tilted in either direction from the substantially vertical position. It will be observed that the linkage providing for mean pitch compensation when the lift line of the rear rotor is tilted is such that greater mean pitch increases takes place for a given angular tilt of the lift line in a range angularly offset from the vertical than in a range close to the vertical. This is of importance and automatically provides the proper extent of mean pitch compensation, since a given angular tilt of the lift line in the range close to the vertical position results in only minor loss of lift, whereas the same degree of inclination in a range somewhat removed from the vertical results in a greater loss of lift.

Referring again to Figure 2, it is noted that when employing driven rotors as herein contemplated, the rotation of the blades 8 and 9 of the two main rotors in opposite directions neutralizes the counter-torque effect of the two main rotors. Drive of the rear rotor, however, will set up a torque effect tending to rotate the machine about a vertical axis, but since the rear rotor is relatively small and carries only a minor portion of the total sustention of the aircraft, the tendency for the aircraft to rotate will be rather slight. However, any such tendency which may remain may readily be compensated for by displacement of the directional control or "rudder" bar 60, which will cause the rear rotor to set up a lateral thrust component in a sense compensating for the tendency of the torque effect to rotate the aircraft about a vertical axis.

According to the foregoing, a control system is provided for a multiple rotor aircraft, particularly an aircraft incorporating three rotors in the arrangement fully described, the control system providing for control of vertical flight, control about the rolling axis, and control about the pitching axis, all by means of mechanisms operating to regulate the mean rotor blade pitch angle of the several rotors, cyclic pitch control mechanism being utilized only in the small diameter rear rotor and only in one plane, for the purpose of securing directional control. In this way appreciable simplification of blade mountings, hub arrangements and control parts is brought about.

The mechanism shown in Figure 3 (including especially the interconnected levers 21 and 29) constitutes a highly effective and simple system for combining control motions originating at two different sources but both adapted to regulate a given pitch control function.

As the rear rotor may be controlled to carry a varying amount of lift load, proper flight balance may be obtained for an unusually large variation in center of gravity position longitudinally of the aircraft. Adjustment for change in longitudinal c. g. location is accomplished merely by changing the neutral position of the longitudinal control stick.

I claim:

1. An aircraft comprising a pair of side-by-side bladed rotors rotatable about generally upright axes and providing the major sustension for the aircraft and a third bladed rotor rotatable about a generally upright axis offset longitudinally of the aircraft from the axes of the first rotors, and mechanism for controlling the attitude of the aircraft about the three principal control axes including controllable means for differentially varying the mean blade pitch of the first rotors to control the aircraft about its rolling axis, controllable means for varying the mean blade pitch of the third rotor to control the aircraft about its pitching axis, and controllable means for laterally tilting the lift line of the third rotor to control the aircraft about a vertical axis.

2. An aircraft comprising three bladed sustaining rotors, two of which are arranged as a side-by-side pair and the third of which is offset from said pair toward the rear of the aircraft, all three rotors being arranged to rotate about generally upright axes, and mechanism for controlling the attitude of the aircraft including controllable means for differentially varying the mean blade pitch of the rotors of said pair to control the aircraft about its rolling axis, and controllable means for laterally tilting the lift line of the rear rotor to control the aircraft about a vertical axis.

3. An aircraft in accordance with claim 2 and further including controllable means for varying the mean blade pitch of the rear rotor to control the aircraft about its pitching axis.

4. An aircraft comprising three bladed sustaining rotors, two of which are arranged as a side-by-side pair and the third of which is offset from said pair toward the rear of the aircraft, all three rotors being arranged to rotate about generally upright axes, and mechanism for effecting directional control of the aircraft comprising controllable means for laterally tilting the lift line of the rear rotor, and means automatically operated by actuation of said controllable means to concurrently increase the mean pitch of said rear rotor when the lift line thereof is tilted in either direction from the substantially upright position.

5. An aircraft comprising a bladed sustaining rotor mounted toward the front of the aircraft and another bladed sustaining rotor mounted toward the rear of the aircraft, controllable means providing for lateral tilt of the lift line of the rear rotor in each of two opposite directions from a substantially upright position to provide for control of the aircraft in yaw, and means for varying the mean rotor blade pitch of said rear rotor automatically operated by actuation of said controllable means to increase the mean rotor blade pitch upon lateral tilt of the lift line from the substantially upright position.

6. An aircraft comprising a bladed sustaining rotor mounted toward the front of the aircraft and another bladed sustaining rotor mounted toward the rear of the aircraft, and mechanism for controlling the aircraft including a pilot operable control member movable in transverse and longitudinal planes, means interconnecting said control member with the front rotor to provide for introduction of control moments in roll when the control member is moved in the transverse plane, means interconnecting said control member and the rear rotor and providing for variation of the mean blade pitch of the rear rotor upon movement of the control member in the longitudinal plane, a foot operable control element, and control means connecting the blades of the rear rotor with the foot operable element and providing for lateral shift of the lift line of the rear rotor upon actuation of the foot operable element.

7. In an aircraft, a pair of variable pitch bladed sustaining rotors, for each rotor a vertically movable pitch control member, first and second pilot operable control means providing respectively for differentially and similarly moving the pitch control members for said rotors, and control connections between said pilot operable means and said pitch control members adapted to superimpose said differential and similar motions on each other, said mechanism including for each rotor a first lever pivoted to the pitch control member for that rotor and connected with the first pilot operable means, a second lever pivoted to a fixed part and connected with the second pilot operable means, and linkage interconnecting the first and second levers and providing a fulcrum for the first lever on the second lever.

8. A construction according to claim 7 in which the vertically movable pitch control member for each rotor is connected with the blades thereof to effect variation of the mean blade pitch of that rotor, and in which the first and second pilot operable control means provide respectively for differential variation of mean rotor blade pitch and for similar variation of mean rotor blade pitch of the two rotors.

HARRIS S. CAMPBELL.

References Cited in the file of this patent

UNITED STATES PATENTS

| Number | Name | Date |
|---|---|---|
| 1,783,011 | Florine | Nov. 25, 1930 |
| 1,919,089 | Breguet et al. | July 18, 1933 |
| 2,230,370 | Baynes | Feb. 4, 1941 |
| 2,233,747 | Riedl | Mar. 4, 1941 |
| 2,344,967 | Bennett | Mar. 28, 1944 |
| 2,414,766 | Platt | Jan. 21, 1947 |
| 2,417,003 | MacAlpin | Mar. 4, 1947 |
| 2,432,677 | Platt | Dec. 16, 1947 |
| 2,439,089 | Hodson | Apr. 6, 1948 |
| 2,464,991 | Roby | Mar. 22, 1949 |
| 2,496,624 | Heintze | Feb. 7, 1950 |

FOREIGN PATENTS

| Number | Country | Date |
|---|---|---|
| 155,974 | Switzerland | Oct. 1, 1932 |
| 637,938 | France | Feb. 13, 1928 |

Disclaimer 2,670,804.—*Harris S. Campbell*, Bryn Athyn, Pa. AIRCRAFT HAVING ROTATIVE SUSTAINING BLADES AND CONTROL MECHANISM FOR SUCH AIRCRAFT. Patent dated Mar. 2, 1954. Disclaimer filed June 25, 1964, by the assignee, *Autogiro Company of America*.

Hereby enters this disclaimer to claims 6, 7 and 8 of said patent.

[*Official Gazette September 15, 1964*]